US009638066B2

(12) United States Patent
Honma et al.

(10) Patent No.: US 9,638,066 B2
(45) Date of Patent: May 2, 2017

(54) RANKINE CYCLE APPARATUS AND COMBINED HEAT AND POWER SYSTEM

(71) Applicant: Panasonic Intellectual Property Management Co., Ltd., Osaka-shi, Osaka (JP)

(72) Inventors: Masaya Honma, Saitama (JP); Atsuo Okaichi, Osaka (JP); Osao Kido, Kyoto (JP); Takumi Hikichi, Osaka (JP); Masanobu Wada, Osaka (JP); Osamu Kosuda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/792,272

(22) Filed: Jul. 6, 2015

(65) Prior Publication Data

US 2015/0308294 A1    Oct. 29, 2015

Related U.S. Application Data

(63) Continuation of application No. PCT/JP2013/007667, filed on Dec. 27, 2013.

(30) Foreign Application Priority Data

Jan. 10, 2013    (JP) .................................. 2013-002408

(51) Int. Cl.
*F01K 17/02*    (2006.01)
*F01K 7/16*    (2006.01)
(Continued)

(52) U.S. Cl.
CPC ................ *F01K 17/02* (2013.01); *F01K 7/16* (2013.01); *F01K 15/00* (2013.01); *F22B 1/1869* (2013.01);
(Continued)

(58) Field of Classification Search
CPC . F01K 17/02; F01K 7/16; F01K 15/00; F22B 1/1807; F22B 21/24; F28D 7/0075; Y02E 20/14
(Continued)

(56) References Cited

U.S. PATENT DOCUMENTS 1,680,380 A * 8/1928 Jahn ...................... F22B 1/1807
122/21
1,925,646 A * 9/1933 Rakestraw ............ F22B 1/1807
122/359
(Continued)

FOREIGN PATENT DOCUMENTS

CA    1 238 539    6/1988
DE    197 00 350    7/1998
(Continued)

OTHER PUBLICATIONS

International Search Report issued in International Application No. PCT/JP2013/007667, Mar. 11, 2014, 4 pages.

*Primary Examiner* — Gregory Huson
*Assistant Examiner* — Daniel E Namay
(74) *Attorney, Agent, or Firm* — Hamre, Schumann, Mueller & Larson, P.C.

(57) ABSTRACT

A Rankine cycle apparatus includes a pump, an evaporator, an expander, and a condenser. The evaporator has a plurality of heat transfer tubes arranged in rows in a flow direction of a high-temperature fluid to be heat-exchanged with a working fluid. The heat transfer tube located in a most upstream row in the flow direction of the high-temperature fluid is defined as a most upstream heat transfer tube. For example, the most upstream heat transfer tube forms an inlet of the evaporator so that the working fluid flows into the evaporator through the inlet and first passes through the most upstream heat transfer tube.

18 Claims, 11 Drawing Sheets

(51) Int. Cl.
*F22B 1/18* (2006.01)
*F22B 21/24* (2006.01)
*F01K 15/00* (2006.01)
*F28D 7/00* (2006.01)

(52) U.S. Cl.
CPC ............ *F22B 21/24* (2013.01); *F28D 7/0075* (2013.01); *Y02E 20/14* (2013.01)

(58) Field of Classification Search
USPC ..... 237/12, 12.1; 60/653; 165/108, 150, 151
IPC ................ F01K 17/02,7/16, 15/00; F22B 1/18, 21/24
See application file for complete search history.

(56) References Cited

U.S. PATENT DOCUMENTS

| | | | | |
|---|---|---|---|---|
| 1,964,256 | A * | 6/1934 | Fahrenwald | F24H 1/41 165/135 |
| 2,218,898 | A * | 10/1940 | Spanner | F22B 1/1807 122/7 R |
| 2,570,247 | A * | 10/1951 | Kals | F28D 5/02 165/104.25 |
| 2,614,541 | A | 10/1952 | Armacost | |
| 4,426,959 | A * | 1/1984 | McCurley | F16L 5/14 122/33 |
| 4,483,392 | A * | 11/1984 | Korsmo | F28D 7/08 165/122 |
| 4,627,386 | A * | 12/1986 | Duffy | F01K 9/00 122/1 B |
| 4,658,762 | A * | 4/1987 | Kendall | C10G 9/20 122/18.4 |
| 4,989,405 | A * | 2/1991 | Duffy | F01K 9/00 122/7 R |
| 4,995,453 | A * | 2/1991 | Bartlett | F25B 39/00 165/150 |
| 5,050,541 | A * | 9/1991 | Kobayashi | F22B 1/1869 122/235.11 |
| 5,159,897 | A | 11/1992 | Franke et al. | |
| 5,575,244 | A | 11/1996 | Dethier | |
| 7,383,791 | B2 | 6/2008 | Franke et al. | |
| 7,406,928 | B2 | 8/2008 | Franke et al. | |
| 8,631,657 | B2 * | 1/2014 | Hagen | B60H 1/032 237/12.1 |
| 2003/0024695 | A1 * | 2/2003 | Ho-Hsin | F28D 1/0417 165/151 |
| 2003/0213247 | A1 * | 11/2003 | Hanna | F01K 17/02 60/670 |
| 2003/0213248 | A1 * | 11/2003 | Osborne | F01K 17/02 60/670 |
| 2003/0213854 | A1 | 11/2003 | Stickford et al. | |
| 2006/0123823 | A1 * | 6/2006 | Ha | F02G 5/00 62/238.7 |
| 2006/0191676 | A1 * | 8/2006 | Horn | B60H 1/00428 165/202 |
| 2006/0283967 | A1 * | 12/2006 | Cho | F24F 3/1423 237/12.1 |
| 2008/0302879 | A1 * | 12/2008 | Malmrup | F02C 1/04 237/12.1 |
| 2009/0133642 | A1 * | 5/2009 | Asakura | F22D 1/10 122/32 |
| 2010/0187319 | A1 * | 7/2010 | Isom | F01K 25/10 237/12 |
| 2010/0194111 | A1 * | 8/2010 | Van Den Bossche | F01K 3/247 290/2 |
| 2011/0061388 | A1 | 3/2011 | Lehar et al. | |
| 2012/0255304 | A1 * | 10/2012 | Li | F01K 17/02 60/670 |
| 2012/0306208 | A1 * | 12/2012 | Mikus | F01K 13/02 290/52 |
| 2013/0247571 | A1 * | 9/2013 | Pickard | F01K 7/22 60/648 |

FOREIGN PATENT DOCUMENTS

| | | |
|---|---|---|
| EP | 0 357 590 | 3/1990 |
| EP | 0 599 115 | 6/1994 |
| GB | 2 296 964 | 7/1996 |
| JP | 60-251388 | 12/1985 |
| JP | 3-170701 | 7/1991 |
| JP | 2001-065801 | 3/2001 |
| JP | 2002-147701 | 5/2002 |
| JP | 2006-250081 | 9/2006 |
| JP | 2006-322692 | 11/2006 |
| JP | 2007-504425 | 3/2007 |
| JP | 2007-504431 | 3/2007 |
| JP | 2007-298244 | 11/2007 |
| JP | 2008-032367 | 2/2008 |
| JP | 2011-064451 | 3/2011 |
| JP | 2012-007600 | 1/2012 |
| WO | 93/23702 | 11/1993 |

\* cited by examiner

RANKINE CYCLE APPARATUS AND COMBINED HEAT AND POWER SYSTEM

This is a continuation of International Application No. PCT/JP2013/007667, with an international filing date of Dec. 27, 2013, which claims the foreign priority of Japanese Patent Application No. 2013-002408, filed on Jan. 10, 2013, the entire contents of both of which are hereby incorporated by reference.

BACKGROUND OF THE INVENTION

1. Field of the Invention

The present disclosure relates to a Rankine cycle apparatus and a combined heat and power system.

2. Description of Related Art

As well known to those skilled in the art, a Rankine cycle is a theoretical cycle of a steam turbine. The Rankine cycle has long been studied and developed. At the same time, as described in US 2003/0213854 A1, combined heat and power (CHP) systems based on the Rankine cycle have also been studied and developed. The CHP system is a system configured to produce two or more forms of energy such as heat and electricity simultaneously from one or more sources. In recent years, not only large-scale CHP systems but also CHP systems installable in relatively small-scale facilities such as hospitals, schools, and libraries and CHP systems for use in residential houses (so-called micro CHPs) have been receiving attention.

SUMMARY OF THE INVENTION

The CHP system of US 2003/0213854 A1 is configured to generate electricity using combustion gas produced in a gas boiler as thermal energy for a Rankine cycle apparatus. US 2003/0213854 A1 also discloses a structure of an evaporator for preventing excessive heating of a gaseous organic working fluid in a boiler.

It may be true that the evaporator disclosed in US 2003/0213854 A1 is effective when the Rankine cycle apparatus is in rated operation. However, it is not clear whether the same effect can be obtained when the Rankine cycle apparatus is not in rated operation. One non-limiting and exemplary embodiment of the present disclosure provides a novel technique to prevent excessive heating of a working fluid in a Rankine cycle apparatus.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

In one general aspect, the techniques disclosed here feature a Rankine cycle apparatus including:

a pump that pressurizes a working fluid;

an evaporator that heats the working fluid discharged from the pump;

an expander that expands the working fluid heated in the evaporator; and a condenser that cools the working fluid discharged from the expander.

In the Rankine cycle apparatus, the evaporator includes a plurality of heat transfer tubes arranged in rows in a flow direction of a high-temperature fluid to be heat-exchanged with the working fluid.

When the heat transfer tube located in a most upstream row in the flow direction of the high-temperature fluid is defined as a most upstream heat transfer tube, the following requirement (A), (B) or (C) is satisfied:

(A) the most upstream heat transfer tube forms an inlet of the evaporator so that the working fluid flows into the evaporator through the inlet and first passes through the most upstream heat transfer tube;

(B) the rows include a first section and a second section, the first section including the most upstream heat transfer tube, and the second section including the heat transfer tubes other than the most upstream heat transfer tube so that the second section accepts the working fluid having passed through the first section and allows the working fluid to exchange heat with the high-temperature fluid in a counter-flow manner; and (C) the rows include a first section and a second section, the first section being composed of rows adjacent to each other and including the most upstream heat transfer tube in one of the rows and the heat transfer tube forming an inlet of the evaporator in a row other than the row of the most upstream heat transfer tube, and the second section being located downstream of the first section in the flow direction of the high-temperature fluid and accepting the working fluid having passed through the first section.

These general and specific aspects may be implemented using a system, a method, and a computer program, and any combination of systems, methods, and computer programs.

With the technique described above, it is possible to prevent excessive heating of a working fluid.

DETAILED DESCRIPTION

Excessive heat exchange that occurs between a high-temperature fluid such as a combustion gas produced by a gas burner and a gaseous working fluid in an evaporator of a Rankine cycle apparatus may cause defects such as thermal decomposition of the working fluid and degradation of a lubricant. This problem becomes pronounced when an organic working fluid is used and when an expander that requires a lubricant is used.

Figure 10:
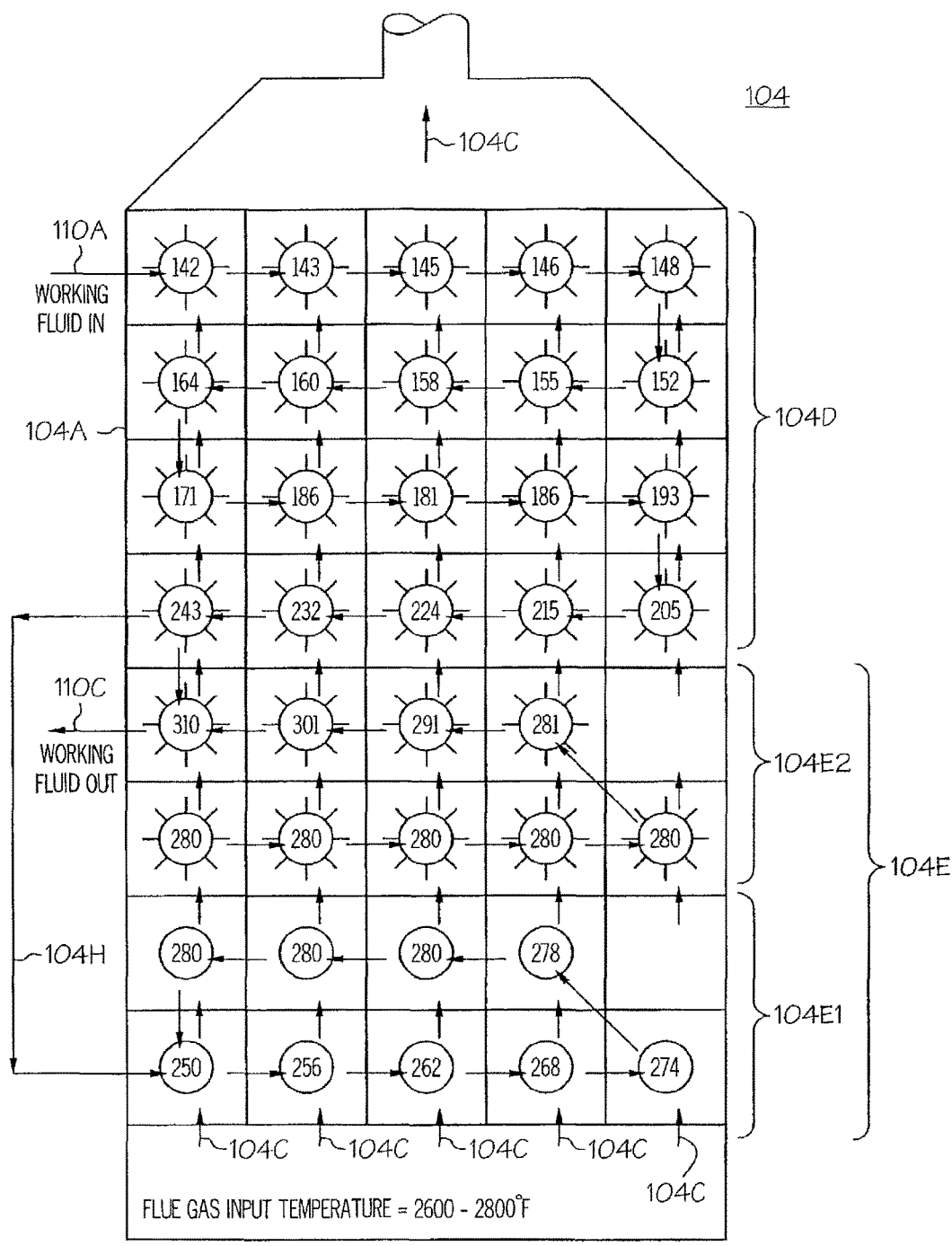
FIG. 10 is a configuration diagram of an evaporator described in US 2003/0213854 A1.

In order to avoid the above problem, US 2003/0213854 A1 proposes an evaporator 104 having a structure shown in FIG. 10. The evaporator 104 is provided with a working fluid inlet 110A on the downstream side of a flow path 104C of a high-temperature fluid (combustion gas produced by a burner). The working fluid flowing into a distal portion 104D through the inlet 110A exchanges heat with the high-temperature fluid in a counter-flow manner. Then, the working fluid is delivered to a proximal portion 104E located on the upstream side of the flow path 104C for the high-temperature fluid through a connecting pipe 104H. In the proximal portion 104E, the working fluid flows through a first section 104E1 and a second section 104E2 in this order. This means that in the proximal portion 104E, the working fluid exchanges heat with the high-temperature fluid in a parallel-flow manner. A working fluid outlet 110C is provided near the center of an enclosure 104A. Numbers in heat transfer tubes (encircled numbers) represent the temperatures (Fahrenheit degrees) of the working fluid.

It is presumed that the evaporator 104 shown in FIG. 10 can indeed prevent excessive heating of the working fluid. This is because the working fluid is supposed to be in a liquid phase in the distal portion 104D, in a liquid phase or a gas-liquid two phase in the first section 104E1, and in a gas-liquid two phase or a gas phase in the second section 104E2. However, this is mere supposition based on the assumption that the Rankine cycle apparatus is in rated operation. For example, if the circulation rate of the working fluid is reduced with changes in electricity demand, the working fluid may already be in a gas phase in the first section 104E1. As a result, the gaseous working fluid may be excessively heated in the first section 104E1.

Reducing the heating power of the burner based on the circulation rate of the working fluid is an effective means, but this is not necessarily sufficient in terms of responsiveness. In recent years, an attempt to use solid fuels such as biomass and wood pellets instead of gaseous fuels has been considered. Combustion of solid fuels in a pellet boiler is less stable than combustion of gaseous fuels in a gas boiler. Pellet boilers are essentially unsuitable for rapidly increasing or reducing the heating power. Therefore, the techniques to prevent excessive heating of the working fluid are increasingly important.

In view of the above circumstances, a first aspect of the present disclosure provides a Rankine cycle apparatus including:

a pump that pressurizes a working fluid;

an evaporator that heats the working fluid discharged from the pump;

an expander that expands the working fluid heated in the evaporator; and a condenser that cools the working fluid discharged from the expander, wherein the evaporator includes a plurality of heat transfer tubes arranged in rows in a flow direction of a high-temperature fluid to be heat-exchanged with the working fluid, and when the heat transfer tube located in a most upstream row in the flow direction of the high-temperature fluid is defined as a most upstream heat transfer tube, the following requirement (A), (B) or (C) is satisfied:

(A) the most upstream heat transfer tube forms an inlet of the evaporator so that the working fluid flows into the evaporator through the inlet and first passes through the most upstream heat transfer tube;

(B) the rows include a first section and a second section, the first section including the most upstream heat transfer tube, and the second section including the heat transfer tubes other than the most upstream heat transfer tube so that the second section accepts the working fluid having passed through the first section and allows the working fluid to exchange heat with the high-temperature fluid in a counter-flow manner; and (C) the rows include a first section and a second section, the first section being composed of rows adjacent to each other and including the most upstream heat transfer tube in one of the rows and the heat transfer tube forming an inlet of the evaporator in a row other than the row of the most upstream heat transfer tube, and the second section being located downstream of the first section in the flow direction of the high-temperature fluid and accepting the working fluid having passed through the first section.

According to the first aspect, it is ensured that the liquid-phase or gas-liquid two phase working fluid passes through the most upstream heat transfer tube. Therefore, it is possible to prevent excessive rise in the temperature of the inner peripheral surface of the most upstream heat transfer tube and thereby prevent thermal decomposition of the working fluid. In addition, in the case where the expander is a type of expander that requires a lubricant, it is possible to reduce deterioration of the lubricant in the evaporator.

A second aspect of the present disclosure provides the Rankine cycle apparatus according to the first aspect, wherein the requirement (C) is satisfied, and at least a portion of the first section is configured to allow the working fluid and the high-temperature fluid to exchange heat with each other in a counter-flow manner. According to the second aspect, the first section makes it possible to improve the heat exchange efficiency of the evaporator sufficiently.

A third aspect of the present disclosure provides the Rankine cycle apparatus according to the second aspect, wherein the second section is composed of rows adjacent to each other and is configured to allow the working fluid and the high-temperature fluid to exchange heat with each other in a parallel-flow manner in the heat transfer tubes located in at least two of the adjacent rows. Such a configuration is disadvantageous in terms of heat exchange efficiency, but is advantageous in preventing thermal decomposition of the working fluid.

A fourth aspect of the present disclosure provides the Rankine cycle apparatus according to the second aspect, wherein the second section is composed of rows adjacent to each other and is configured to allow the working fluid and the high-temperature fluid to exchange heat with each other in a counter-flow manner in the heat transfer tubes located in at least two of the adjacent rows. In this case, the second section makes it possible to improve the heat exchange efficiency of the evaporator sufficiently.

A fifth aspect of the present disclosure provides the Rankine cycle apparatus according to the first aspect, wherein both the requirement (A) and the requirement (B) are satisfied. According to the fifth aspect, it is possible to ensure the effects of the first aspect more reliably and to improve the heat exchange efficiency of the evaporator sufficiently.

A sixth aspect of the present disclosure provides the Rankine cycle apparatus according to any one of the first to fifth aspects, wherein the evaporator further includes a heat insulating structure that prevents heat transfer between the first section and the second section. The heat insulating structure prevents heat exchange between the working fluid near the inlet of the evaporator and the working fluid near the outlet thereof and thus contributes to achieving high heat exchange efficiency.

A seventh aspect of the present disclosure provides the Rankine cycle apparatus according to the sixth aspect, wherein the evaporator is a fin tube heat exchanger including a fin, the first section and the second section share the fin, and the heat insulating structure includes a through hole formed in the fin at a boundary between the first section and the second section. The through hole formed in the fin reduces the cross-sectional area of the heat transfer path from the second section to the first section. Therefore, the through hole prevents heat transfer from the second section to the first section.

An eighth aspect of the present disclosure provides the Rankine cycle apparatus according to any one of the first to seventh aspects, wherein a member constituting the first section is spaced from a member constituting the second section. Such a configuration prevents heat exchange between the working fluid near the inlet of the evaporator and the working fluid near the outlet thereof and thus contributes to achieving high heat exchange efficiency.

An ninth aspect of the present disclosure provides the Rankine cycle apparatus according to any one of the first to eighth aspects, wherein the first section includes nothing but the heat transfer tube or the heat transfer tubes, and the second section has a structure of a fin tube heat exchanger. Such a configuration prevents heat exchange between the working fluid near the inlet of the evaporator and the working fluid near the outlet thereof and thus contributes to achieving high heat exchange efficiency.

A tenth aspect of the present disclosure provides the Rankine cycle apparatus according to any one of the first to ninth aspects, wherein the number of rows in the second section is larger than the number of rows in the first section. According to the tenth aspect, it is possible to ensure, for example, a sufficient length of a flow path where the working fluid and the high-temperature fluid exchange heat with each other in a counter-flow manner. This is advantageous in increasing the heat exchange efficiency of the evaporator and also contributes to reducing the size of the evaporator.

An eleventh aspect of the present disclosure provides the Rankine cycle apparatus according to any one of the first to tenth aspects, wherein an outer diameter of the heat transfer tube included in the first section is larger than an outer diameter of the heat transfer tube included in the second section. With the use of the heat transfer tube having a relatively large outer diameter in the first section, it is possible to maintain the working fluid in a liquid phase or in a gas-liquid two phase in general in the first section, although the heat exchange efficiency in the first section slightly decreases.

An twelfth aspect of the present disclosure provides the Rankine cycle apparatus according to any one of the first to eleventh aspects, wherein the most upstream heat transfer tube is an internally smooth tube. With such a configuration, it is possible to maintain the working fluid in a liquid phase or in a gas-liquid two phase in general in the most upstream heat transfer tube, although the heat exchange efficiency in the most upstream heat transfer tube slightly decreases.

A thirteenth aspect of the present disclosure provides the Rankine cycle apparatus according to any one of the first to twelfth aspects, wherein the evaporator is a fin tube heat exchanger including a fin, and the fin is a flat fin without a cut-and-raised portion. With the use of a flat fin, it is possible to prevent overheating of the working fluid in the first section, although the heat exchange efficiency therein slightly decreases.

A fourteenth aspect of the present disclosure provides the Rankine cycle apparatus according to any one of the first to thirteenth aspects, wherein the most upstream heat transfer tube is offset in the flow direction of the high-temperature fluid. According to the fourteenth aspect, it is possible to prevent the working fluid from turning into a gas phase and being decomposed by heat in the most upstream heat transfer tube.

A fifteenth aspect of the present disclosure provides a combined heat and power system including:

the Rankin cycle apparatus according to any one of the first to fourteenth aspects; and a heat medium circuit in which a heat medium flows, the heat medium serving as a low-temperature heat source for cooling the working fluid in the condenser of the Rankine cycle apparatus.

With the use of the Rankine cycle apparatus according to any one of the first to fourteenth aspects, it is possible to provide a reliable combined heat and power system.

A sixteenth aspect of the present disclosure is an evaporator for use in a Rankine cycle, including a plurality of heat transfer tubes arranged in rows in a flow direction of a high-temperature fluid to be heat-exchanged with a working fluid in the Rankine cycle, wherein when the heat transfer tube located in a most upstream row in the flow direction of the high-temperature fluid is defined as a most upstream heat transfer tube, the following requirement (A), (B) or (C) is satisfied:

(A) the most upstream heat transfer tube forms an inlet of the evaporator so that the working fluid flows into the evaporator through the inlet and first passes through the most upstream heat transfer tube;

(B) the rows include a first section and a second section, the first section including the most upstream heat transfer tube, and the second section including the heat transfer tubes other than the most upstream heat transfer tube so that the second section accepts the working fluid having passed through the first section and allows the working fluid to exchange heat with the high-temperature fluid in a counter-flow manner; and (C) the rows include a first section and a second section, the first section being composed of rows adjacent to each other and including the most upstream heat transfer tube in one of the rows and the heat transfer tube forming an inlet of the evaporator in a row other than the row of the most upstream heat transfer tube, and the second section being located downstream of the first section in the flow direction of the high-temperature fluid and accepting the working fluid having passed through the first section.

When the evaporator according to the sixteenth aspect is used in a Rankine cycle apparatus, the same effects as those of the first aspect can be obtained.

Hereinafter, embodiments of the present disclosure will be described with reference to the drawings. It should be noted that the present disclosure is not limited by the embodiments described hereinafter.

Figure 1:
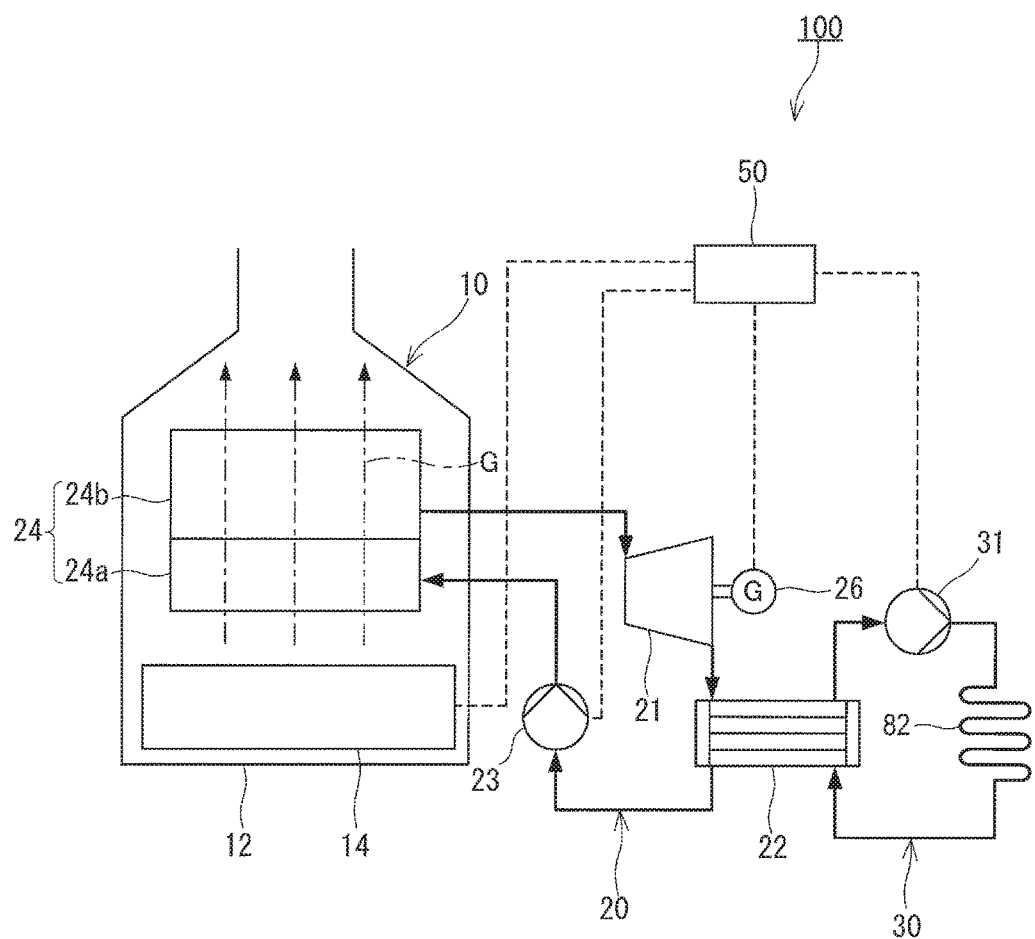
FIG. 1 is a configuration diagram of a CHP system according to an embodiment of the present disclosure.

As shown in FIG. 1, a combined heat and power system (hereinafter referred to as "CHP system") 100 of the present embodiment includes a boiler 10, a Rankine cycle apparatus 20, a heat medium circuit 30, and a controller 50. The CHP system 100 is configured to supply hot water and electricity simultaneously or separately using thermal energy produced in the boiler 10. The term "simultaneously" is used to mean that electricity can be supplied while hot water is supplied.

The boiler 10 includes a combustion chamber 12 and a combustor 14. A discharge port is provided at the top of the combustion chamber 12. The combustor 14 is a heat source that produces combustion gas G, and is disposed inside the combustion chamber 12. The combustion gas G produced in the combustor 14 moves upwardly in the internal space of the combustion chamber 12, and is discharged outside through the discharge port. With the use of the combustor 14 that produces combustion gas G as a heat source in the CHP system 100, high-temperature thermal energy can easily be obtained. Consequently, the efficiency of the electricity generation by the Rankine cycle apparatus 20 can be improved. Another device such as an air blower may be disposed inside the boiler 10.

The boiler 10 is, for example, a gas boiler. When the boiler 10 is a gas boiler, a fuel gas such as natural gas and biogas is supplied to the combustor 14. The combustor 14 produces high-temperature combustion gas G by burning the fuel gas. The boiler 10 may be another type of boiler such as a pellet boiler. In this case, a solid fuel such as wood pellets is supplied to the combustor 14.

The Rankine cycle apparatus 20 includes an expander 21, a condenser 22, a pump 23, and an evaporator 24. These components are connected circularly by a plurality of pipes in the order mentioned above so as to form a closed circuit. The Rankin cycle apparatus 20 may be provided with a commonly-known regenerator or the like.

The expander 21 expands the working fluid and converts the expansion energy of the working fluid into the rotary power. An electric generator 23 is connected to the rotating shaft of the expander 21. The electric generator 26 is driven by the expander 21. The expander 21 is, for example, a positive-displacement expander or a turbo-expander. Examples of the positive-displacement expander include scroll expanders, rotary expanders, screw expanders, and reciprocating expanders. The turbo-expander is a so-called expansion turbine.

A positive-displacement expander is recommended as the expander 21. Generally, positive-displacement expanders operate efficiently over a wider range of speeds than in a range of speeds at which turbo-expanders operate efficiently. For example, a positive-displacement expander can keep operating efficiently at half the rated speed or less. In other words, the amount of electricity generation can be reduced to half the rated amount of electricity generation or less while the expander can keep operating efficiently. With the use of such a positive-displacement expander having this feature, it is possible to flexibly respond to changes in the amount of electricity generation due to changes in the thermal demand. In addition, the amount of electricity generation can be increased or reduced with changes in the electricity demand while the expander keeps operating efficiently.

The condenser 22 allows heat exchange to take place between water in the heat medium circuit 30 and the working fluid discharged from the expander 21, thereby cooling the working fluid and heating the water. A commonly-known heat exchanger, such as a plate heat exchanger and a double tube heat exchanger, can be used as the condenser 22. The type of the condenser 22 is selected as appropriate depending on the type of the heat medium in the heat medium circuit 30. When the heat medium in the heat medium circuit 30 is a liquid such as water, a plate heat exchanger or a double tube heat exchanger can be suitably used as the condenser 22. When the heat medium in the heat medium circuit 30 is a gas such as air, a fin tube heat exchanger can be suitably used as the condenser 22.

The pump 23 draws the working fluid flowing from the condenser 22, pressurizes the working fluid, and supplies the pressurized working fluid to the evaporator 24. A common positive-displacement pump or turbo-pump can be used as the pump 23. Examples of the positive-displacement pump include piston pumps, gear pumps, vane pumps, and rotary pumps. Examples of the turbo-pump include centrifugal pumps, mixed flow pumps, and axial-flow pumps.

The evaporator 24 is a heat exchanger that absorbs the thermal energy of the combustion gas G produced in the boiler 10. The evaporator 24 is, for example, a fin tube heat exchanger, and is disposed inside the boiler 10 so as to be located in the flow path of the combustion gas G. In the present embodiment, the evaporator 24 is located directly above the combustor 14. The combustion gas G produced in the boiler 10 and the working fluid of the Rankine cycle apparatus 20 exchange heat in the evaporator 24. Thus, the working fluid is heated and evaporated.

An organic working fluid can be suitably used as the working fluid of the Rankine cycle apparatus 20. Examples of the organic working fluid include halogenated hydrocarbons, hydrocarbons, and alcohols. Examples of the halogenated hydrocarbons include R-123, R-245fa, and R-1234ze. Examples of the hydrocarbons include alkanes such as propane, butane, pentane, and isopentane. Examples of the alcohols include ethanol. These organic working fluids may be used alone, or a mixture of two or more thereof may be used. Also, there may be a case where an inorganic working fluid such as water, carbon dioxide, and ammonia can be used as the working fluid.

The heat medium circuit 30 is a circuit in which water (heat medium) flows, and is connected to the condenser 22. The water (heat medium) serves as a low-temperature heat source for cooling the working fluid of the Rankine cycle apparatus 20 in the condenser 22. The water in the heat medium circuit 30 is heated by the working fluid discharged from the expander 21. The heat medium circuit 30 is provided with a pump 31 and a heat radiator 82. The heat radiator 82 is, for example, a portion of a house floor heating system. Hot water produced in the condenser 22 is supplied to the heat radiator 82 by the pump 31 and used to heat a room. That is, the heat medium circuit 30 is a hot water heater circuit in the present embodiment. When city water is heated in the condenser 22, the hot water produced in the condenser 22 can also be used for hot-water supply. The total thermal efficiency of the Rankine cycle apparatus 20 can be increased by the effective use of the low-temperature exhaust heat of the working fluid.

When the heat medium to be heated through the heat medium circuit 30 is a liquid such as water or brine as in the present embodiment, the heat medium circuit 30 can be formed by one or more pipes. By contrast, when the heat medium to be heated through the heat medium circuit 30 is a gas such as air, the heat medium circuit 30 can be formed as an air path or a duct for allowing the gas to flow through. Hot air produced in the condenser 22 is supplied to a room and used to heat the room.

Hot water produced in the heat medium circuit 30 can also be supplied to other equipment such as showers, faucets, and hot water storage tanks. That is, the heat medium circuit 30 may be used to reheat lukewarm water, or may be used to heat city water. It should be noted that the CHP system 100 may be configured to use the heat medium circuit 30 to supply electricity alone while stopping the supply of hot water.

The controller 50 controls various targets such as the pump 23, the pump 31, the combustor 14, and the electric generator 26. A DSP (Digital Signal Processor) including an A/D conversion circuit, an input/output circuit, a computing circuit, a memory device, etc. can be used as the controller 50. In the controller 50, a program for operating the CHP system 100 property is stored.

Next, the detailed structure of the evaporator 24 will be described.

Figure 2A:
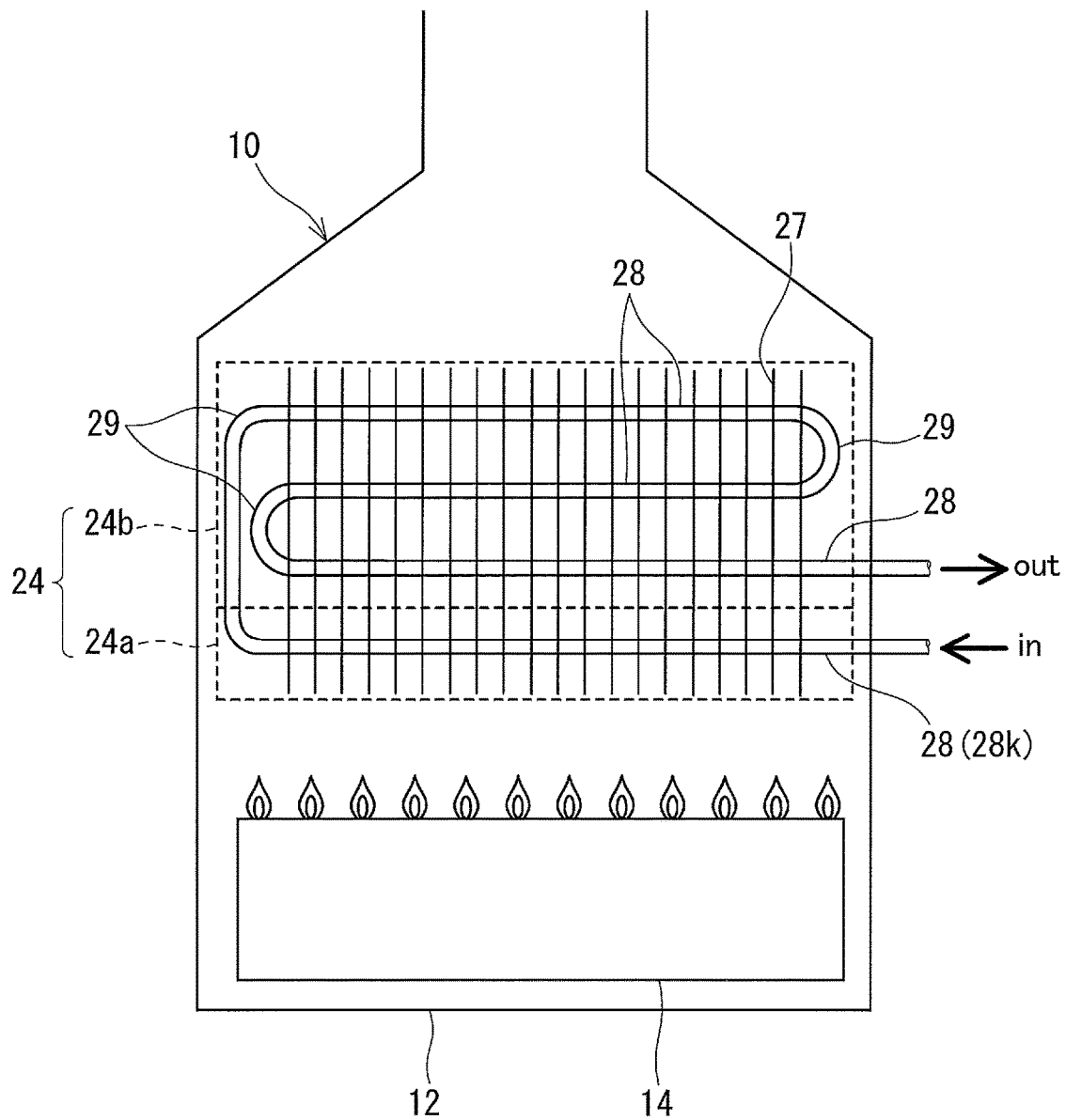
FIG. 2A is a configuration diagram of an evaporator of a Rankine cycle apparatus shown in FIG. 1.
Figure 2B:
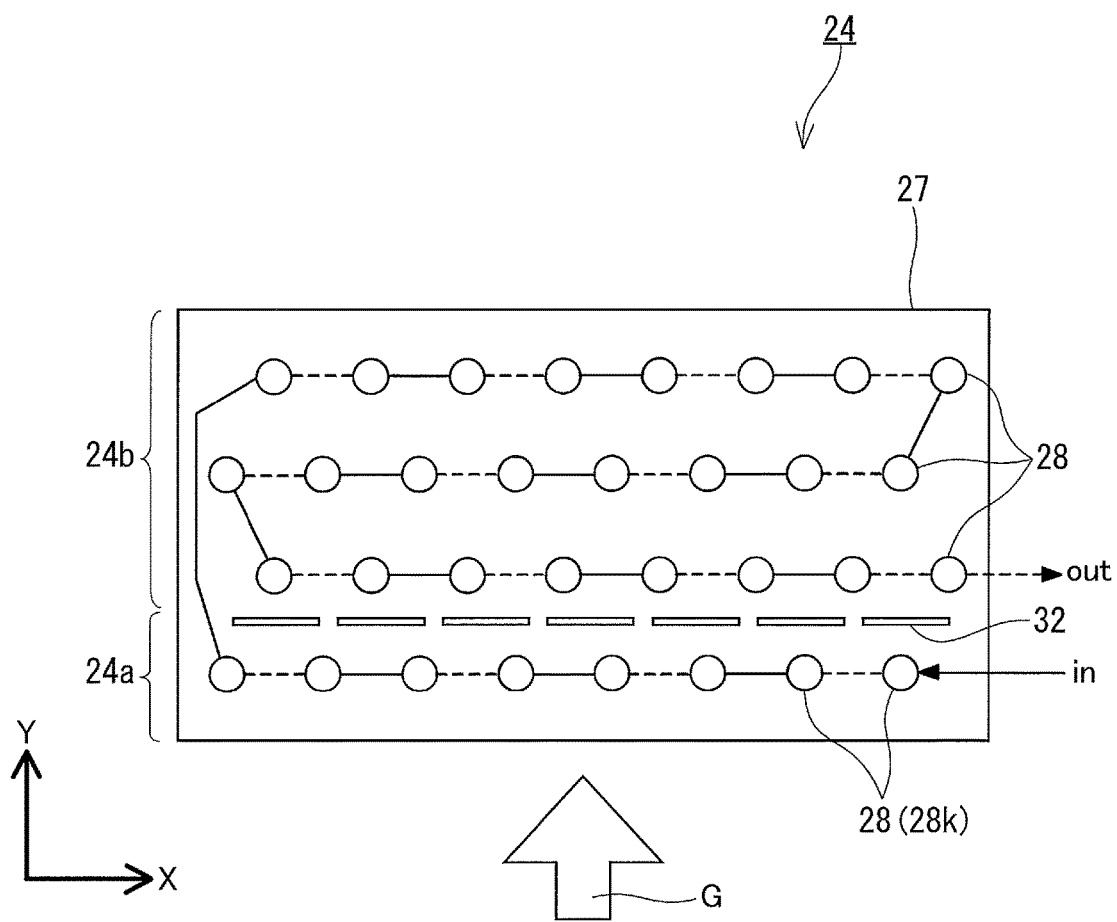
FIG. 2B is a schematic plan view of the evaporator shown in FIG. 2A.

As shown in FIG. 1, FIG. 2A, and FIG. 2B, in the present embodiment, the evaporator 24 is a fin tube heat exchanger having a plurality of fins 27 and a plurality of heat transfer tubes 28. The plurality of fins 27 are aligned in the horizontal direction so that the front and back surfaces of each fin 27 are parallel to the vertical direction. The spaces formed between the adjacent fins 27 form discharge paths of the combustion gas G (high-temperature fluid). The plurality of heat transfer tubes 28 each pierce through the fins 27 in the horizontal direction. The heat transfer tubes 28 are arranged in rows in the flow direction of the combustion gas G to be heat-exchanged with the working fluid (in the height direction). In the present embodiment, four rows of the heat transfer tubes 28 are arranged in the height direction.

As seen from FIG. 2A and FIG. 2B, the heat transfer tubes 28 are also arranged in columns (eight columns in the present embodiment) in the horizontal direction (in the direction perpendicular to the flow direction of the combustion gas G). That is, the heat transfer tubes 28 are arranged in a matrix form in both the height direction (Y direction) and the horizontal direction (X direction). The working fluid first flows through the heat transfer tubes 28 in the same row and then is delivered to the heat transfer tube 28 in another row. When the evaporator 24 is viewed from the direction perpendicular to the surface of the fin 27, as shown in FIG. 2B, the heat transfer tubes 28 are arranged in a staggered manner. The heat transfer tubes 28 are connected to each other by bent tubes 29 provided at both longitudinal ends of each heat transfer tube 28 so as to form a single flow path. It is not essential that the single flow path be formed by all the heat transfer tubes 28. Two or more flow paths may be formed in parallel by using a commonly-known component such as a distributor. A so-called hair-pin tube may be used as the heat transfer tube 28. In this case, a combination of two straight heat transfer tubes 28 and one bent tube 29 can be replaced by a hair-pin tube.

As shown in FIG. 2A and FIG. 2B, the heat transfer tubes 28 located in the most upstream row in the flow direction of the combustion gas G are defined as most upstream heat transfer tubes 28k. One of the most upstream heat transfer tubes 28k forms an inlet of the evaporator 24 so that the working fluid flows into the evaporator 24 through the inlet and first passes through the most upstream heat transfer tube 28k. The most upstream heat transfer tubes 28k are heat transfer tubes that form the most upstream portion of the flow path of the working fluid in the evaporator 24. With such a configuration, the working fluid discharged from the pump 23 first flows through the most upstream heat transfer tube 28k in the evaporator 24. The working fluid discharged from the pump 23 is always in a liquid phase regardless of its flow rate. This means that according to the present embodiment, it is possible to avoid the gaseous working fluid from flowing through the most upstream heat transfer tubes 28k exposed to the highest-temperature combustion gas G.

The temperature of the inner peripheral surface of a heat transfer tube obtained when a working fluid (R-245fa) flowing in the heat transfer tube is heated by a high-temperature combustion gas was calculated in a simple way by the following Formula (1). Table 1 shows the results. In Formula (1) and Table 1 below, "$h_a$" is the heat transfer coefficient of the outer peripheral surface of the heat transfer tube (the surface exposed to the combustion gas). "$T_a$" is the temperature of the combustion gas. "$h_r$" is the heat transfer coefficient of the inner peripheral surface of the heat transfer tube (the surface exposed to the working fluid). "$T_r$" is the temperature of the main flow of the working fluid. "$T_w$" is the temperature of the inner peripheral surface of the heat transfer tube.

$$T_w \approx (h_a T_a + h_r T_r)/(h_a + h_r) \quad (1)$$

TABLE 1

|  | Gas phase | Liquid phase | Two phase |
| --- | --- | --- | --- |
| $h_a$ [W/(m² · K)] | 50 | — | — |
| $T_a$ [° C.] | 1300 | — | — |
| $h_r$ [W/(m² · K)] | 200 | 2000 | 6000 |
| $T_r$ [° C.] | 150 | ← | ← |
| $T_w$ [° C.] | 380 | 178 | 160 |

As shown in Table 1, when the working fluid is in a gas phase, the heat transfer coefficient of the inner peripheral surface of the heat transfer tube is very low. Therefore, when the working fluid is in a gas phase, the temperature of the inner peripheral surface of the heat transfer tube reaches as high as 380° C. This temperature is much higher than 250° C., which is the thermal decomposition temperature of R-245fa. On the other hand, when the working fluid is in a liquid phase or in a gas-liquid two phase, the heat transfer coefficient of the inner peripheral surface of the heat transfer tube is very high, which is ten to several tens of times the heat transfer coefficient of the inner peripheral surface of the heat transfer tube when the working fluid is in a gas phase. Therefore, when the working fluid is in a liquid phase or in a gas-liquid two phase, the temperature of the inner peripheral surface of the heat transfer tube is 178° C. or 160° C., which is low enough.

With the evaporator 24 of the present embodiment, it is ensured that the liquid-phase or gas-liquid two phase working fluid passes through the most upstream heat transfer tube 28k. Accordingly, as is clear from the above calculation results, it is possible to prevent excessive rise in the temperature of the inner peripheral surface of the most upstream heat transfer tube 28k and thereby prevent thermal decomposition of the working fluid. In addition, in the case where the expander 21 is a type of expander that requires a lubricant, it is possible to reduce deterioration of the lubricant in the evaporator 24.

Next, the other features of the evaporator 24 will be described.

As shown in FIG. 2A and FIG. 2B, in the evaporator 24, the rows in which the heat transfer tubes 28 are arranged can be considered to consist of a first section 24a and a second section 24b. The first section 24a is a section including the most upstream heat transfer tubes 28k. The second section 24b is a section including the heat transfer tubes 28 other than the most upstream heat transfer tubes 28k. Specifically, the second section 24b is a section composed of rows adjacent to each other. The second section 24b accepts the working fluid having passed through the first section 24a and allows the working fluid to exchange heat with the combustion gas G in a counter-flow manner. The first section 24a is located closer to the combustor 14, and the second section 24b is located farther from the combustor 14. That is, in the flow direction of the combustion gas G, the second section 24b is located downstream of the first section 24a. The combustion gas G passes through the first section 24a and the second section 24b in this order.

In the present embodiment, the first section 24a includes only the most upstream heat transfer tubes 28k. The second section 24b is formed of the heat transfer tubes 28 other than the most upstream heat transfer tubes 28k. After passing through the first section 24a (the most upstream heat transfer tubes 28k), the working fluid is delivered to the heat transfer tube 28 at the inlet of the second section 24b through the bent tube 29 (connecting tube). Specifically, the working fluid is delivered to the heat transfer tube 28 located in the most downstream row (the top row in FIG. 2A and FIG. 2B) in the flow direction of the combustion gas G. Then, the working fluid flows down through the heat transfer tubes 28 in the second section 24b one by one in sequence from the top row toward the combustor 14 and reaches the heat transfer tube 28 in the bottom row of the second section 24b adjacent to the first section 24a. The outlet of the evaporator 24 is formed by the heat transfer tube 28 in the bottom row of the second section 24b. As described above, in the second section 24b, the flow direction of the working fluid and the flow direction of the combustion gas G are opposed to each other. Therefore, the second section 24b makes it possible to improve the heat exchange efficiency of the evaporator 24 sufficiently.

According to the evaporator 104 described with reference to FIG. 10, the working fluid and the combustion gas exchange heat in a counter-flow manner in the distal portion 104D, but the working fluid and the combustion gas exchange heat in a parallel-flow manner in the proximal portion 104E. Therefore, the heat exchange efficiency is not so high in the proximal portion 104E. In addition, the proximal portion 104E occupies a relatively large portion of the entire evaporator 104. Therefore, the heat exchange efficiency of the evaporator as a whole is not necessarily high.

By contrast, in the present embodiment, the number of rows in the second section 24b is larger than the number of rows in the first section 24a. In other words, the flow path in the second section 24b is longer than the flow path in the first section 24a. Therefore, it is possible to ensure a sufficient length of a flow path where the working fluid and the combustion gas G exchange heat with each other in a counter-flow manner. This is advantageous in increasing the heat exchange efficiency of the evaporator 24 and also contributes to reducing the size of the boiler 10 and the evaporator 24. Furthermore, it is possible to maintain the working fluid in a liquid phase in general in the first section 24a by limiting the number of rows in the first section 24a appropriately. It is desirable that the working fluid be maintained in a liquid phase at the outlet of the first section 24a (the bent tube 29 in FIG. 2A). Thereby, it is possible to prevent the working fluid from turning into a gas phase and being decomposed by heat in the first section 24a. It should be noted that the working fluid may be converted from a liquid phase into a gas-liquid two phase in the first section 24a.

The ratio of the number of rows N2 in the second section 24b to the number of rows N1 in the first section 24a (N2/N1) is not particularly limited. The ratio (N2/N1) can be determined so as to maintain the working fluid in a liquid phase or in a gas-liquid two phase in the first section 24a. In the present embodiment, the ratio (N2/N1) is 3.

The outer diameter of the heat transfer tubes 28 included in the first section 24a (the most upstream heat transfer tubes 28k in the present embodiment) is larger than the outer diameter of the heat transfer tubes 28 included in the second section 24b. Generally, in a fin tube heat exchanger, the heat transfer coefficient of a refrigerant-side surface decreases as the outer diameter of a heat transfer tube increases. Therefore, with the use of the heat transfer tube 28 having a relatively large outer diameter in the first section 24a, it is possible to maintain the working fluid in a liquid phase or in a gas-liquid two phase in general in the first section 24a, as in the case of limiting the number of rows in the first section 24a, although the heat exchange efficiency in the first section 24a slightly decreases. Thereby, it is possible to prevent the working fluid from turning into a gas phase and being decomposed by heat in the first section 24a.

The ratio (D2/D1) of the outer diameter D2 of the heat transfer tube 28 in the second section 24b to the outer diameter D1 of the heat transfer tube 28 in the first section 24a is not particularly limited. The ratio (D2/D1) can be determined so as to maintain the working fluid in a liquid phase or in a gas-liquid two phase in the first section 24a.

In the present embodiment, an internally smooth tube is used as the most upstream heat transfer tube 28k. With such a configuration, it is possible to maintain the working fluid in a liquid phase or in a gas-liquid two phase in general in the most upstream heat transfer tubes 28k, as in the case of limiting the number of rows in the first section 24a, although the heat exchange efficiency in the most upstream heat transfer tubes 28k slightly decreases. Thereby, it is possible to prevent the working fluid from turning into a gas phase and being decomposed by heat in the most upstream heat transfer tubes 28k. Internally smooth tubes may be used for all the heat transfer tubes forming the first section 24a.

As well known to those skilled in the art, an internally grooved tube is used in a fin tube heat exchanger of an outdoor unit or an indoor unit of an air conditioner. An internally grooved tube is a heat transfer tube designed for use in an evaporator and for use for a working fluid such as a refrigerant in a gas-liquid two phase. In a heat transfer tube having grooves formed in the inner peripheral surface thereof, a liquid refrigerant flows through the grooves. Therefore, the heat transfer coefficient of the inner peripheral surface of the heat transfer tube is increased, and thus the heat exchange efficiency of the evaporator is increased. However, in the present embodiment, the working fluid flowing in the most upstream heat transfer tube 28k can be in a liquid phase. In this case, there is no clear advantage of using an internally grooved tube as the most upstream heat transfer tube 28k. Conversely, when an internally smooth tube is used as the most upstream heat transfer tube 28k, the pressure loss can be reduced and thus the load on the pump 23 can be reduced. As a result, the efficiency of the Rankine cycle apparatus 20 can be increased.

It is recommended to use internally grooved tubes as the heat transfer tubes 28 in the second section 24b. An internally grooved tube has a larger heat transfer area than an internally smooth tube with the same outer diameter. Therefore, the use of an internally grooved tube increases the heat exchange efficiency. In most part of the second section 24b, the working fluid is supposed to be in a gas-liquid two phase. This is one of the reasons why internally grooved tubes are recommended for use as the heat transfer tubes 28 in the second section 24b.

When the evaporator 24 is designed to allow the working fluid to flow through the flow path in the order as shown in FIG. 2A and FIG. 2B, a portion of the flow path of the working fluid near the inlet of the evaporator 24 is adjacent to a portion of the flow path of the working fluid near the outlet of the evaporator 24. In this case, heat exchange takes place between the working fluid near the inlet and the working fluid near the outlet, which may cause a decrease in the heat exchange efficiency. The evaporator 104 described with reference to FIG. 10 also has this problem.

In order to address the above problem, the evaporator 24 of the present embodiment further has a heat insulating structure that prevents heat transfer between the first section 24a and the second section 24b. Such a heat insulating structure prevents heat exchange between the working fluid near the inlet of the evaporator 24 and the working fluid near the outlet thereof and thus contributes to achieving high heat exchange efficiency.

As shown in FIG. 2B, a specific example of the heat insulating structure is at least one through hole 32 formed in each of the fins 27. In the present embodiment, the evaporator 24 is a fin tube heat exchanger, and the first section 24a and the second section 24b share the fins 27. In addition, the through holes 32 as the heat insulating structure are formed at the boundary between the first section 24a and the second section 24b. Specifically, the through holes 32 are slits 32. The slits 32 are formed at regular intervals in a direction perpendicular to the longitudinal direction of the heat transfer tube 28 (in a direction perpendicular to the flow direction of the combustion gas G). The slits 32 may be formed in a row or may be formed in rows.

The presence of the slits 32 significantly reduces the cross-sectional area of the heat transfer path from the second section 24b to the first section 24a (i.e., the cross-sectional area of the fin 27). Therefore, the slits 32 sufficiently prevent heat transfer from the second section 24b to the first section 24a. Since the first section 24a and the second section 24b share the fins 27, not only it is possible to reduce the number of parts of the evaporator 24 but also it is easier to assemble the evaporator 24. In addition, since it is relatively easy to form the slits 32 in the fin 27, the formation of the slits 32 is less likely to cause an increase in the production cost.

It is also possible to form through holes other than the slits 32 as long as the cross-sectional area of the heat transfer path from the second section 24b to the first section 24a can be reduced. That is, the shape of the through hole is not particularly limited. Holes of various shapes such as circular, rectangular, and elliptical holes may be formed at the boundary between the first section 24a and the second section 24b. Moreover, only one sufficiently long slit 32 may be formed along the boundary between the first section 24a and the second section 24b.

In the present embodiment, the fin 27 is a flat fin without a cut-and-raised portion such as a louver. With the use of a flat fin, it is possible to prevent overheating of the working fluid in the first section 24a, although the heat exchange efficiency slightly decreases. As a result, it is possible to maintain the working fluid in a liquid phase or in a gas-liquid two phase in general in the first section 24a. Thereby, it is possible to prevent the working fluid from turning into a gas phase and being decomposed by heat in the first section 24a.

The most upstream heat transfer tubes 28k may be offset in the flow direction of the combustion gas G so as to space the most upstream heat transfer tubes 28k at a suitable distance from the combustor 14. Thereby, it is possible to prevent the working fluid from turning into a gas phase and being decomposed by heat in the most upstream heat transfer tubes 28k. For example, it is possible to adjust the position of the most upstream heat transfer tubes 28k so that the distance between the most upstream heat transfer tubes 28k and the heat transfer tubes 28 in the second row from the bottom be smaller than the distance between the heat transfer tubes 28 in the second row from the bottom and the heat transfer tubes 28 in the third row from the bottom.

The CHP system 100 is operated according to the following procedure, for example.

First, the pump 23 is actuated to start the operation of the Rankine cycle apparatus 20. The pump 31 in the heat medium circuit 30 is actuated at an appropriate time to circulate water through the heat medium circuit 30. When the circulation rate of the working fluid reaches a predetermined rate, supply of a fuel to the combustor 14 is started and the fuel is ignited. The working fluid of the Rankine cycle apparatus 20 receives heat from the combustion gas G produced in the boiler 10 in the evaporator 24 and changes to a superheated gaseous form. The high-temperature gaseous working fluid is delivered to the expander 21. In the expander 21, the pressure energy of the working fluid is converted to mechanical energy, so that the electric generator 26 is driven. Thus, electricity is generated in the electric generator 26. The working fluid discharged from the expander 21 flows into the condenser 22. The working fluid may maintain the superheated state at the outlet of the expander 21. In the condenser 22, the working fluid is cooled and condensed by water circulating in the heat medium circuit 30. The water in the heat medium circuit 30 is heated by the working fluid. Hot water is produced in the heat medium circuit 30, and the produced hot water is supplied to the heat radiator 32. The condensed working fluid is pressurized by the pump 23, and is delivered to the evaporator 24 again.

In the present specification, the boiler 10 is given as an example of the heat source for producing a high-temperature fluid. However, the heat source is not limited to the boiler 10 as long as a fluid such as air can be heated to a sufficiently high temperature.

Hereinafter, some modifications of the evaporator will be described. The features of the modifications can be combined with each other unless a technical contradiction arises. In addition, the features of the modifications can each be combined with those of the evaporator 24 described with reference to FIG. 2A and FIG. 2B. The details described for the evaporator 24 can apply to the modifications below unless a technical contradiction arises.

(First Modification)

Figure 3:
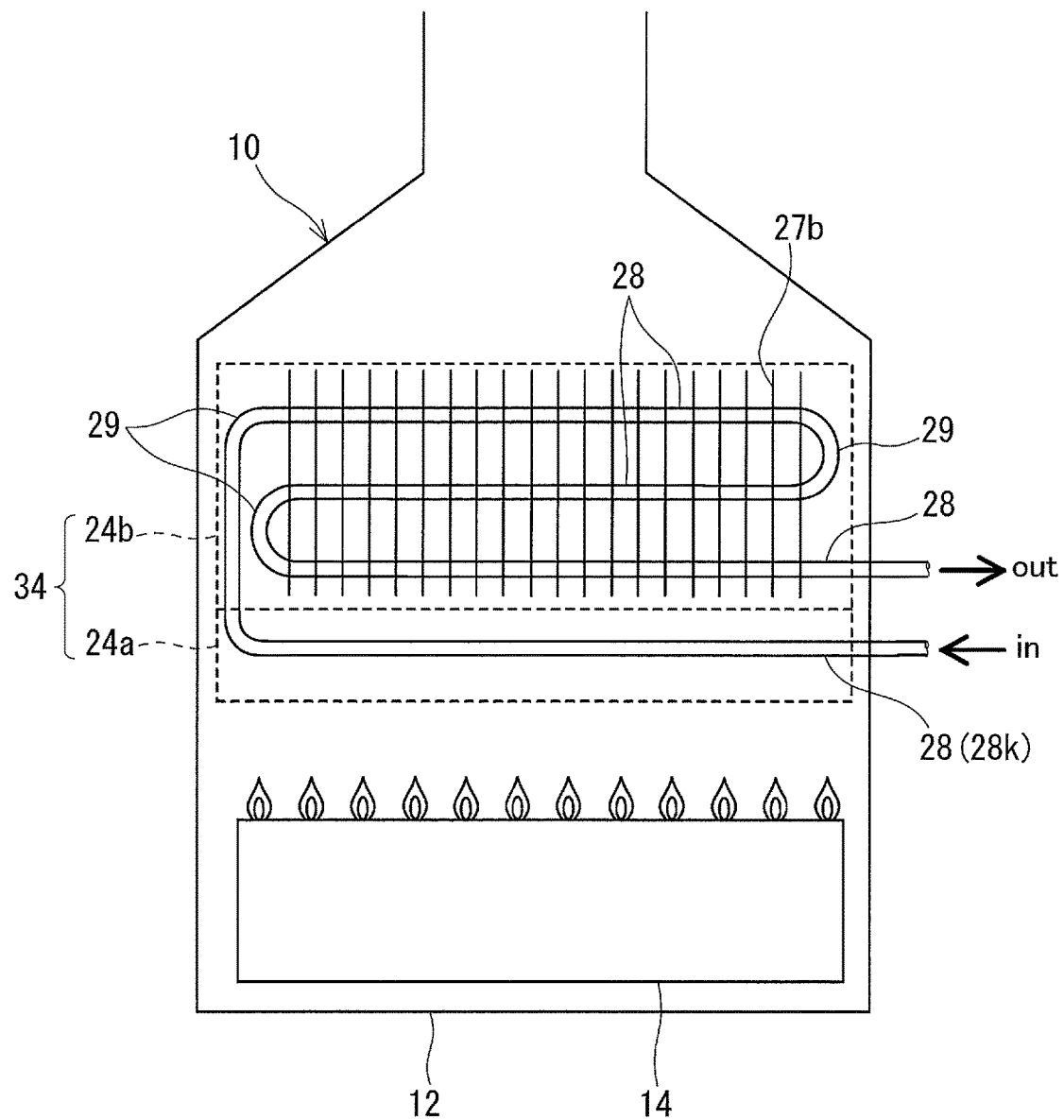
FIG. 3 is a configuration diagram of an evaporator according to a first modification.

As shown in FIG. 3, in an evaporator 34 according to the first modification, the first section 24a includes nothing but the heat transfer tubes 28 located in the same row (specifically, the most upstream heat transfer tubes 28k). The second section 24b has a structure of a fin tube heat exchanger. Fins 27b dedicated for the second section 24b are shorter than the fins 27 described with reference to FIG. 2A and FIG. 2B. The lower end of each of the fins 27b is located in a space between the heat transfer tubes 28k in the first section 24a and the heat transfer tubes 28 in the second section 24b in the flow direction of the combustion gas G. The heat transfer tubes 28 in the first section 24a (i.e., the most upstream heat transfer tubes 28k) are not in contact with the heat transfer tubes 28 and the fins 27b in the second section 24b in the flow direction of the combustion gas G. That is, a member constituting the first section 24a is spaced from a member constituting the second section 24b. A space serving as a discharge path of the combustion gas G lies between the first section 24a and the second section 24b. Such a configuration prevents heat exchange between the working fluid near the inlet of the evaporator 34 and the working fluid near the outlet thereof and contributes to achieving high heat exchange efficiency.

(Second Modification)

Figure 4:
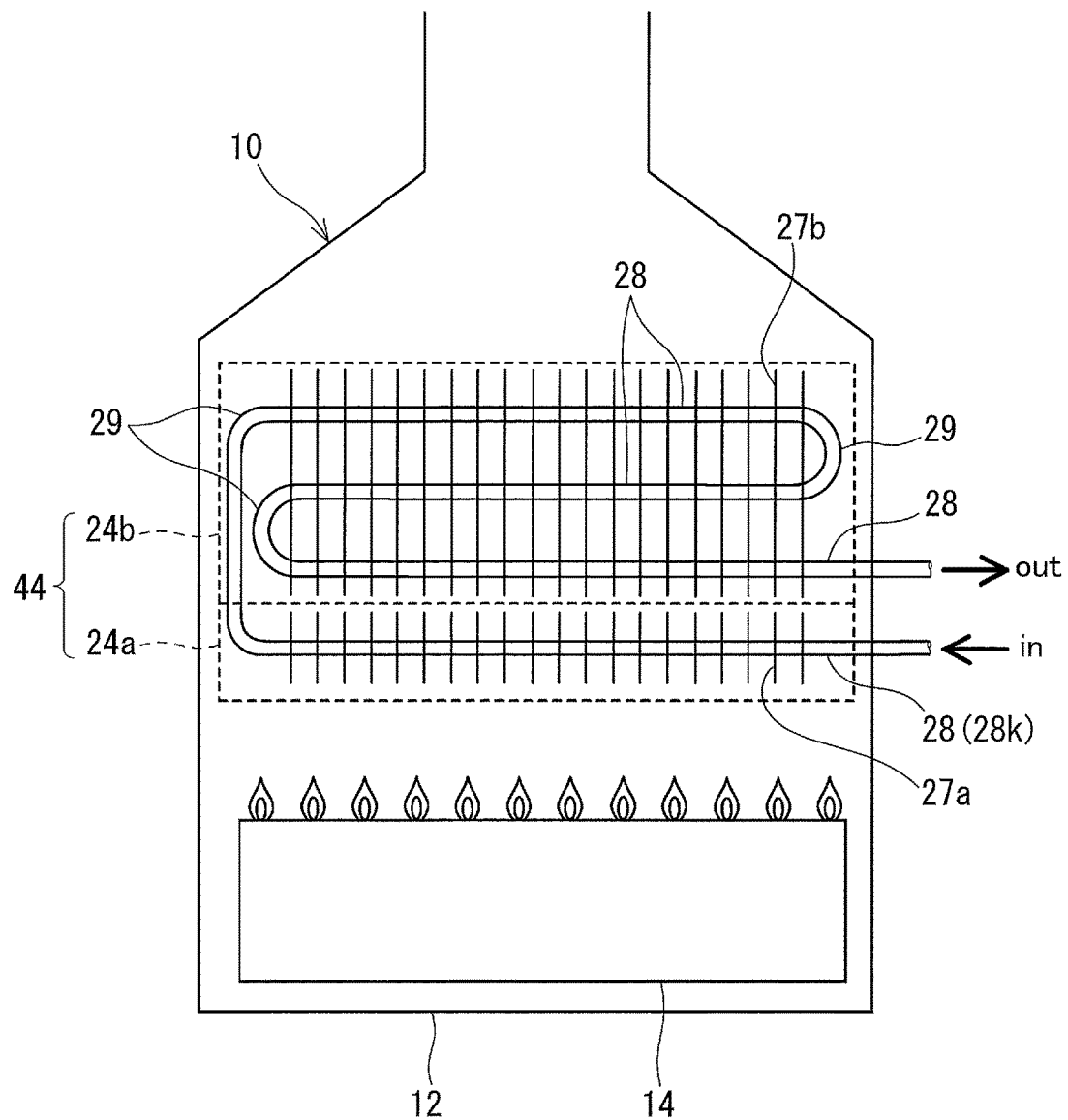
FIG. 4 is a configuration diagram of an evaporator according to a second modification.

As shown in FIG. 4, an evaporator 44 according to the second modification is a fin tube heat exchanger including a plurality of fins 27a and a plurality of fins 27b. In this modification, both the first section 24a and the second section 24b have a structure of a fin tube heat exchanger. The fins 27a in the first section 24a are fins dedicated to the first section 24a. The fins 27a in the first section 24a are parts different from the fins 27b in the second section 24b. In the flow direction of the combustion gas G, a gap of appropriate width is provided between the fins 27a and the fins 27b. That is, also in this modification, a member constituting the first section 24a is spaced from a member constituting the second section 24b. Therefore, the same effect as that of the first modification can be obtained in this modification. In addition, since the fins 27a are attached to the heat transfer tubes 28 in the first section 24a (the most upstream heat transfer tubes 28k), high heat exchange efficiency can be achieved not only in the second section 24b but also in the first section 24a.

(Third Modification)

Figure 5:
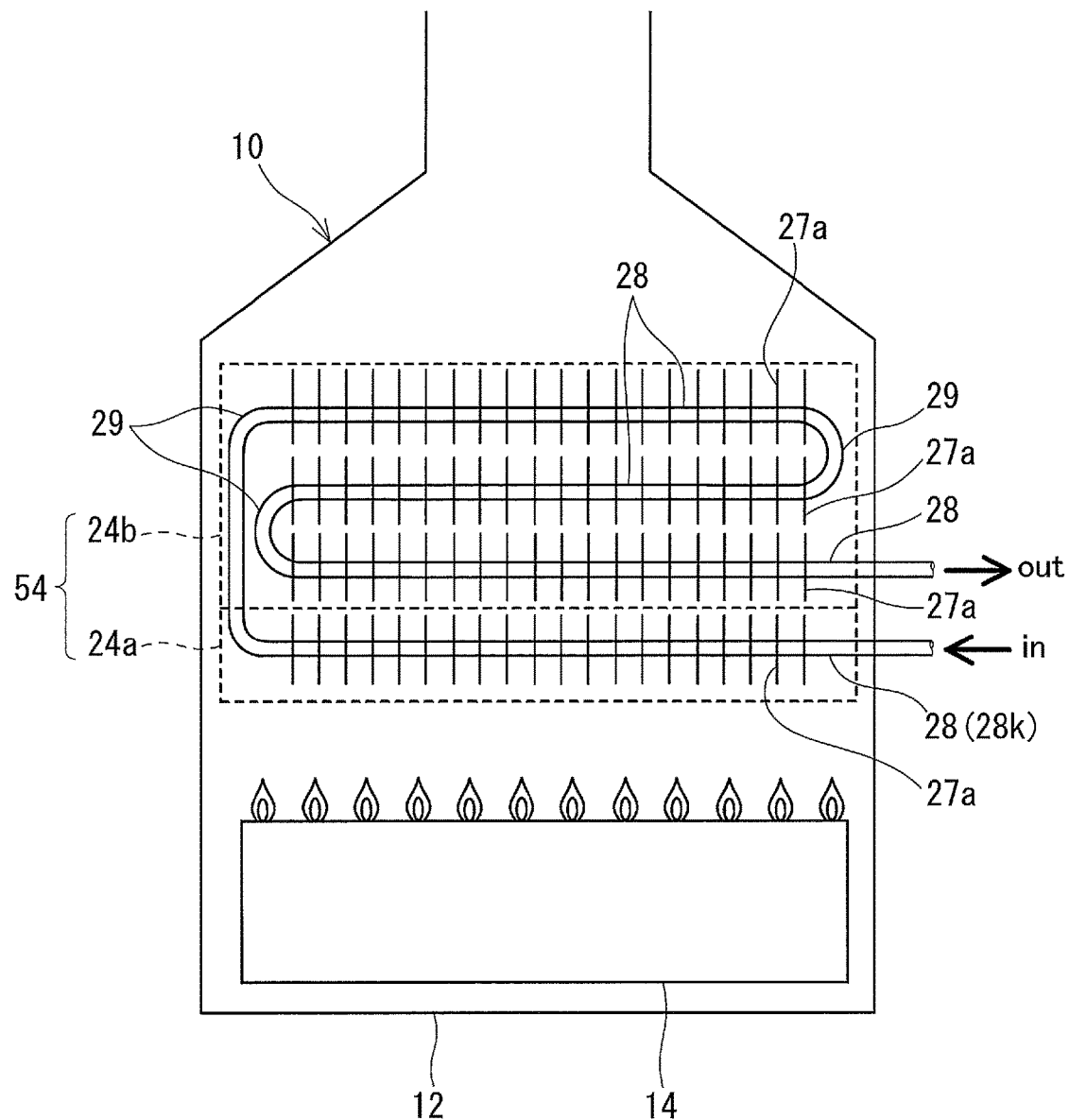
FIG. 5 is a configuration diagram of an evaporator according to a third modification.

As shown in FIG. 5, an evaporator 54 according to the third modification is a fin tube heat exchanger including a plurality of fins 27a. The fins 27a are the same fins as those described with reference to the second modification (FIG. 4) and have a rectangular shape in plan view. In this modification, the number of rows of the fins 27a is the same as the number of rows of the heat transfer tubes 28. That is, the evaporator 54 of the third modification has the same structure as a structure obtained by dividing each of the fins 27 described with reference to FIG. 2A and FIG. 2B into the same number of parts as the number of rows of the heat transfer tubes 28 in the height direction. The fin 27a attached to the heat transfer tube 28 located in a row is a part separate from the fin 27a attached to the heat transfer tube 28 located in another row. For the two rows adjacent to each other in the flow direction of the combustion gas G, a gap of appropriate width is provided between the fin 27a attached to the heat transfer tube 28 located in one of these rows and the fin 27a attached to the heat transfer tube 28 located in the other row. According to this modification, it is possible not only to obtain the same effect obtained in the second modification but also to reliably prevent heat transfer from the heat transfer tube 28 located in one of the two adjacent rows to the transfer tube 28 located in the other row.

(Fourth Modification)

Figure 6:
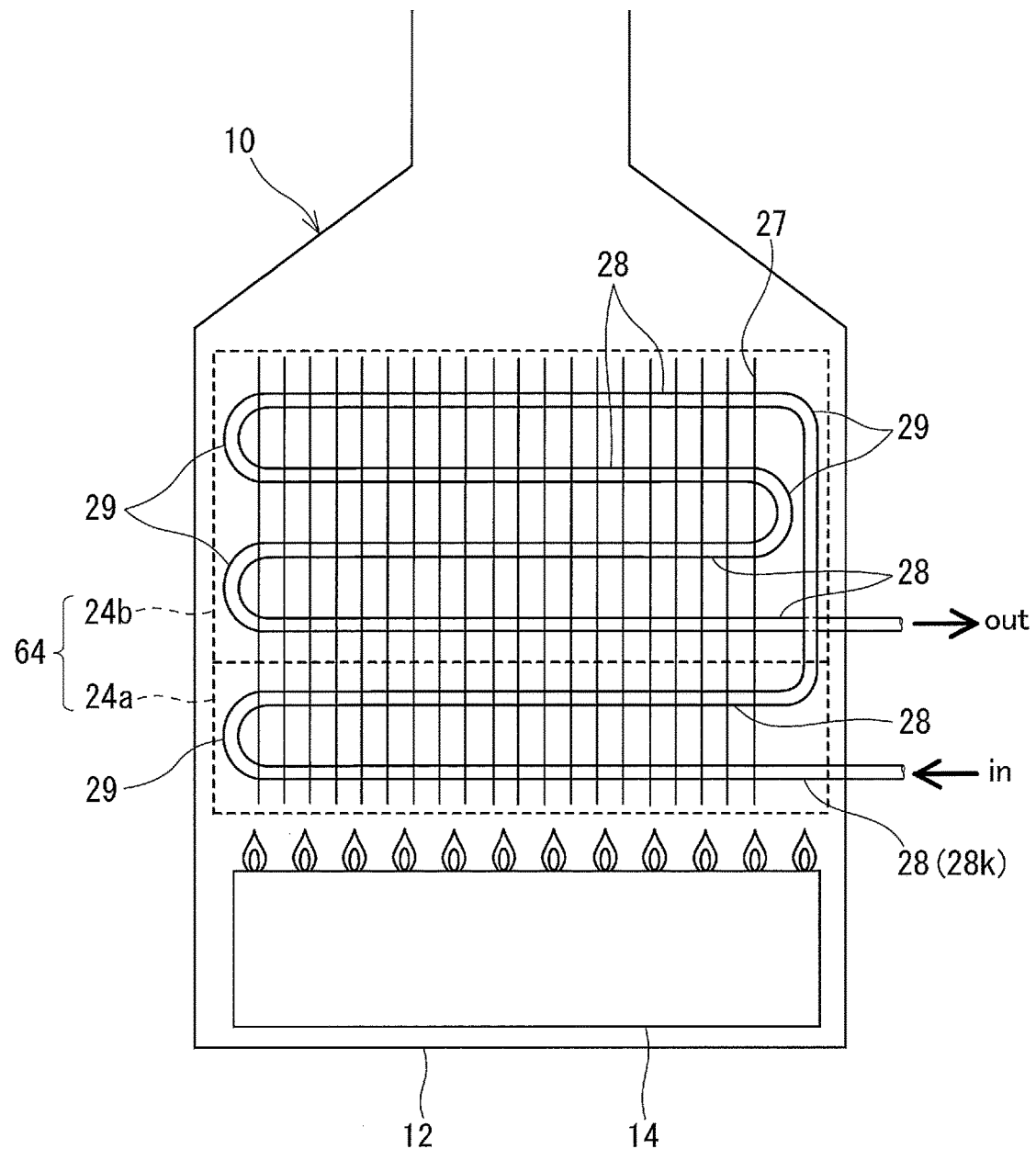
FIG. 6 is a configuration diagram of an evaporator according to a fourth modification.

As shown in FIG. 6, an evaporator 64 according to the fourth modification has the first section 24a and the second section 24b, as in the evaporators 24, 34, 44, 54 described above. However, in this modification, the first section 24a includes the heat transfer tubes 28 located in the bottom row (the most upstream heat transfer tubes 28k) and the heat transfer tubes 28 located in the second row from the bottom. The second section 24b includes the heat transfer tubes 28 located in the four rows. In the first section 24a, the working fluid exchanges heat with the combustion gas G in a parallel-flow manner. In the second section 24b, the working fluid exchanges heat with the combustion gas G in a counter-flow manner. As described above, the number of rows of the heat transfer tubes 28 in the evaporator is not particularly limited. In particular, in this modification, the heat transfer tube 28 forming the outlet of the evaporator 64 is located in the third row from the bottom. In the case where the working fluid may possibly be excessively heated when the Rankine cycle apparatus 20 is in rated operation because the heat transfer tube 28 forming the outlet of the evaporator 64 is too close to the combustor 14, it is effective to increase the number of rows in the first section 24a as in this modification. As described above, it is desirable that the number of rows in the second section 24b be larger than the number of rows in the first section 24a.

In each of the evaporators 24 to 64 shown in FIG. 1 to FIG. 6, the first section 24a can be a section including the most upstream heat transfer tubes 28k. The second section 24b can be a section that is located downstream of the first section 24a in the flow direction of the combustion gas G and is composed of a plurality of rows in which heat exchange takes place in a counter-flow manner.

In the following modifications, the first section 24a can be defined as follows. When the most upstream heat transfer tube 28k forms the inlet of the evaporator, the first section 24a can be a section formed of the row in which the most upstream heat transfer tube 28k is located. When the most upstream heat transfer tube 28k does not form the inlet of the evaporator, the first section 24a can be a section composed of a plurality of rows from the row in which the heat transfer tube 28 forming the inlet of the evaporator is located to the row in which the most upstream heat transfer tube 28k is located. The second section 24b can be a section that is located downstream of the first section 24a in the flow direction of the combustion gas G and accepts the working fluid having passed through the first section 24a.

(Fifth Modification)

Figure 7:
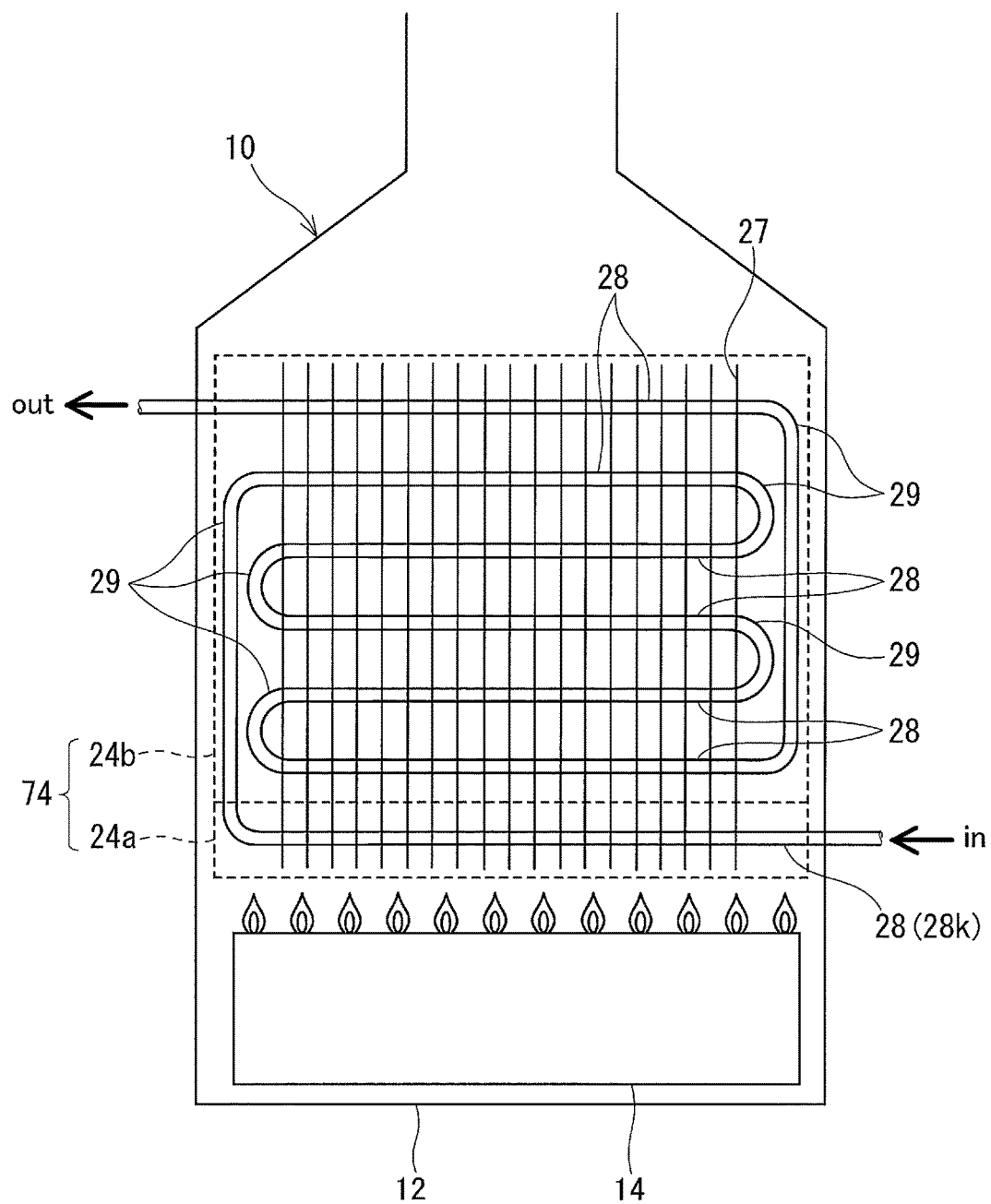
FIG. 7 is a configuration diagram of an evaporator according to a fifth modification.

As shown in FIG. 7, an evaporator 74 according to the fifth modification also has the first section 24a and the second section 24b. A portion of the second section 24b is configured to allow the working fluid and the combustion gas G to exchange heat with each other in a counter-flow manner. The remaining portion of the second section 24b is configured to allow the working fluid and the combustion gas G to exchange heat with each other in a parallel-flow manner. Specifically, in the flow direction of the working fluid, the upstream portion of the second section 24b is configured to allow the working fluid and the combustion gas G to exchange heat with each other in a counter-flow manner. In the flow direction of the working fluid, the downstream portion (the top row) of the second section 24b is configured to allow the working fluid and the combustion gas G to exchange heat with each other in a counter-flow manner. In this modification, the upstream portion of the second section 24b includes the heat transfer tubes 28 located in the rows from the second row from the bottom to the second row from the top. The downstream portion of the second section 24b includes the heat transfer tubes 28 located in the top row. As described above, only a portion of the second section 24b may be configured to allow the working fluid and the combustion gas G to exchange heat with each other in a counter-flow manner.

The upstream portion of the second section 24b may be configured to allow the working fluid and the combustion gas G to exchange heat with each other in a parallel-flow manner. The downstream portion of the second section 24b may be configured to allow the working fluid and the combustion gas G to exchange heat with each other in a counter-flow manner. From the viewpoint of heat exchange efficiency, the number of rows in a portion where heat exchange takes place in a counter-flow manner may be larger than the number of rows in a portion where heat exchange takes place in a parallel-flow manner.

In this modification, the outlet of the evaporator 74 is formed at a position spaced at an appropriate distance from the combustor 14. In the second section 24b, the heat transfer tube 28 forming the outlet of the evaporator 74 is located in one of the rows other than the row adjacent to the first section 24a. Specifically, the outlet of the evaporator 74 is formed by the heat transfer tube 28 located in the row farthest from the first section 24a (i.e., the row farthest from the combustor 14). In this case, it is possible to prevent thermal decomposition of the working fluid more reliably. As a result, the reliability of the CHP system 100 is further enhanced.

(Sixth Modification)

Figure 8:
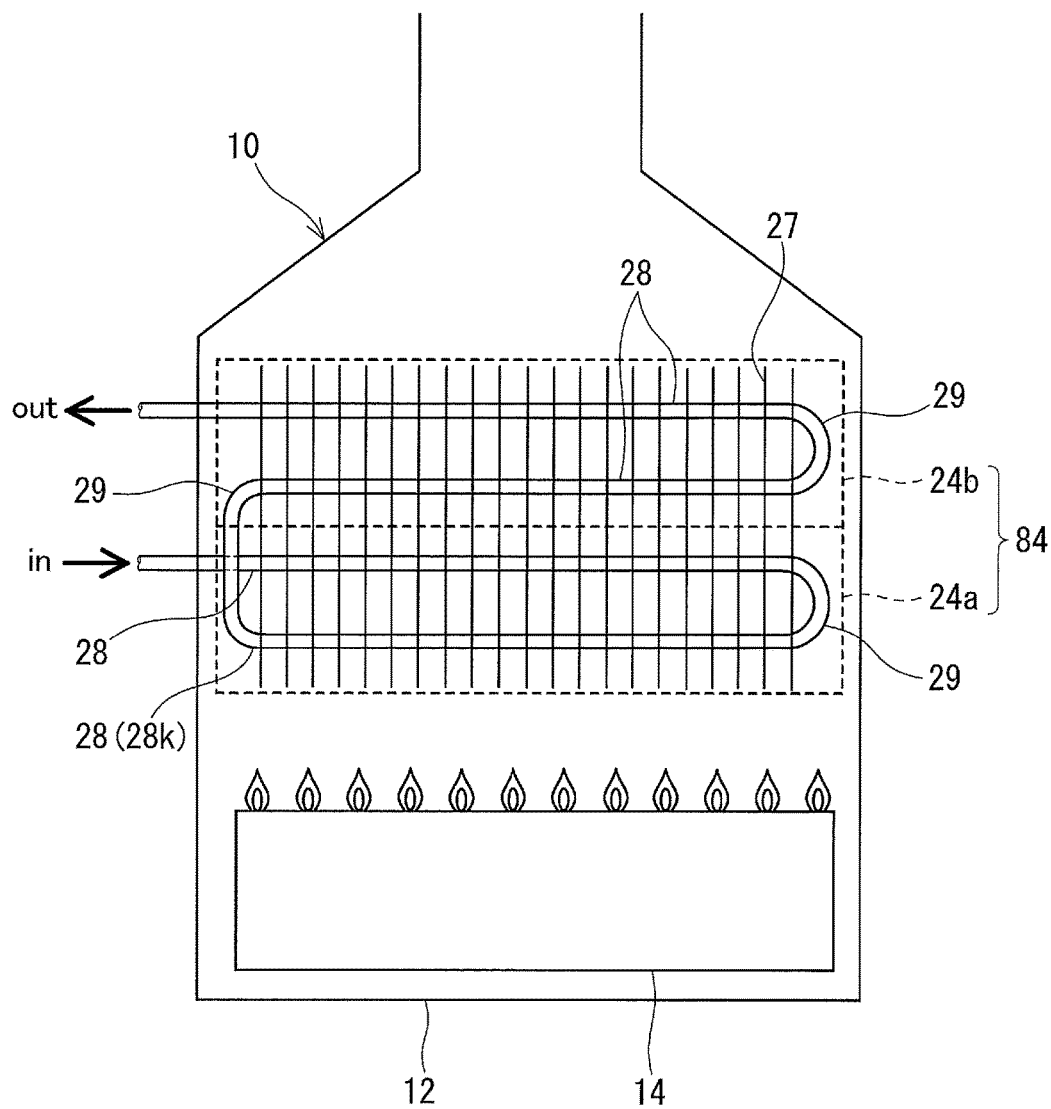
FIG. 8 is a configuration diagram of an evaporator according to a sixth modification.

As shown in FIG. 8, an evaporator 84 according to the sixth modification also has the first section 24a and the second section 24b. The first section 24a is composed of a plurality of rows (rows adjacent to each other). Specifically, the first section 24a includes the most upstream heat transfer tubes 28k and the heat transfer tube 28 forming the inlet of the evaporator 84. The heat transfer tube 28 forming the inlet of the evaporator 84 is located in a row other than the row of the most upstream heat transfer tube 28k. The second section 24b is located downstream of the first section 24a in the flow direction of the combustion gas G and accepts the working fluid having passed through the first section 24a. It is not essential that the inlet of the evaporator 84 be formed by the most upstream heat transfer tube 28k. According to this modification, the working fluid is in a liquid phase or a gas-liquid two phase in the most upstream heat transfer tubes 28k. Therefore, it is possible to prevent thermal decomposition of the working fluid. It is also possible to reduce degradation of a lubricant in the evaporator. It is ensured that the working fluid is maintained in a liquid phase or in a gas-liquid two phase in the first section 24a by appropriately adjusting the number of rows in the first section 24a and the number of rows in the second section 24b.

In this modification, the first section 24a is configured to allow the working fluid and the combustion gas G to exchange heat with each other in a counter-flow manner. That is, the downstream portion of the first section 24a in the flow direction of the working fluid is located relatively close to the combustor 14, and the upstream portion of the first section 24a in the flow direction of the working fluid is located relatively far from the combustor 14. Therefore, the first section 24a makes it possible to increase the heat exchange efficiency of the evaporator 84 sufficiently.

In this modification, the second section 24b is composed of a plurality of rows (rows adjacent to each other). In addition, the second section 24b is configured to allow the working fluid and the combustion gas G to exchange heat with each other in a parallel-flow manner in the heat transfer tubes 28 located in at least two of the adjacent rows. That is, the downstream portion of the second section 24b in the flow direction of the working fluid is located relatively far from the combustor 14, and the upstream portion of the second section 24b in the flow direction of the working fluid is located relatively close to the combustor 14. Such a configuration is disadvantageous in terms of heat exchange efficiency, but is advantageous in preventing thermal decomposition of the working fluid. Specifically, the outlet of the evaporator 84 is formed by the heat transfer tube 28 located in the row farthest from the combustor 14. In this case, it is possible to prevent thermal decomposition of the working fluid more reliably. As a result, the reliability of the CHP system 100 is further enhanced.

(Seventh Modification)

Figure 9:
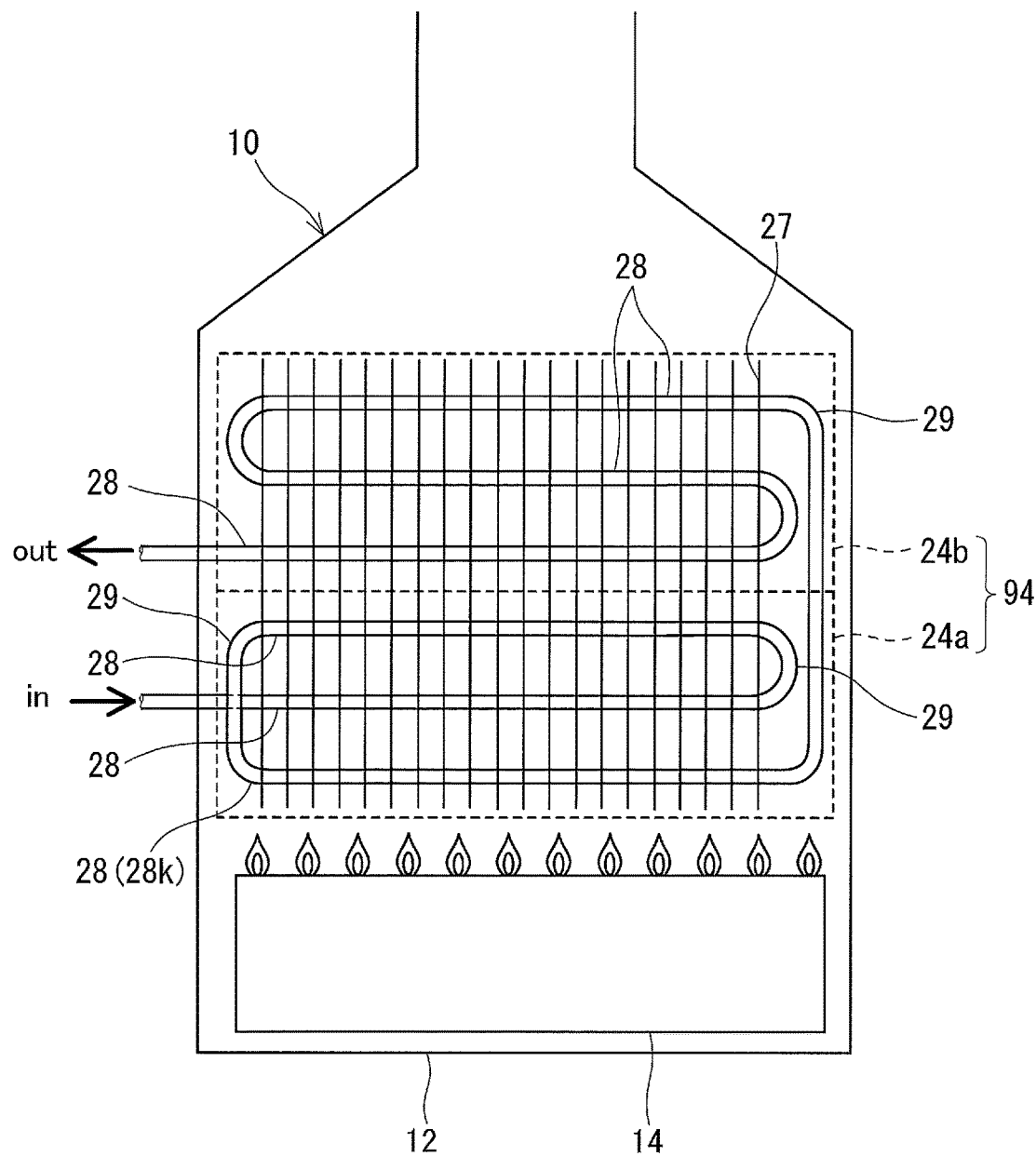
FIG. 9 is a configuration diagram of an evaporator according to a seventh modification.

As shown in FIG. 9, an evaporator 94 according to the seventh modification also has the first section 24a and the second section 24b. The differences between the evaporator 84 of the sixth modification and the evaporator 94 of the seventh modification are as follows. In this modification, the second section 24b is configured to allow the working fluid and the combustion gas G to exchange heat with each other in a counter-flow manner in the heat transfer tubes 28 located in at least two of the adjacent rows. In this case, the second section 24b makes it possible to increase the heat exchange efficiency of the evaporator 94 sufficiently.

The first section 24a includes a portion configured to allow the working fluid and the combustion gas G to exchange heat with each other in a parallel-flow manner and a portion configured to allow the working fluid and the combustion gas G to exchange heat with each other in a counter-flow manner. Specifically, in the upstream portion of the first section 24a in the flow direction of the working fluid, the working fluid and the combustion gas G exchange heat with each other in a parallel-flow manner. In the downstream portion of the first section 24a in the flow direction of the working fluid, the working fluid and the combustion gas G exchange heat with each other in a counter-flow manner. As described above, the first section 24a may include a portion configured to allow the working fluid and the combustion gas G to exchange heat with each other in a parallel-flow manner.

The structures of the evaporators 74, 84, and 94 of the fifth to seventh modifications can be modified as appropriate. As described above, for example, the fin 27 may be divided into separate parts. A heat insulating structure such as a slit may be formed at the boundary between the first section 24a and the second section 24b.

Furthermore, the evaporators described with reference to FIG. 1 to FIG. 9 may each have a portion belonging to neither the first section 24a nor the second section 24b.

The invention may be embodied in other forms without departing from the spirit or essential characteristics thereof. The embodiments disclosed in this specification are to be considered in all respects as illustrative and not limiting. The scope of the disclosure is indicated by the appended claims rather than by the foregoing description, and all changes which come within the meaning and range of equivalency of the claims are intended to be embraced therein.

INDUSTRIAL APPLICABILITY

The techniques disclosed in this specification can be suitably applied not only to systems for generating electricity alone but also to cogeneration systems such as a CHP system. The techniques disclosed in this specification are suitable in particular for systems that require adaptation to frequently changing electricity demand.

What is claimed is:

1. A Rankine cycle apparatus comprising:
a pump that pressurizes a working fluid;
an evaporator that heats the working fluid discharged from the pump;
an expander that expands the working fluid heated in the evaporator; and
a condenser that cools the working fluid discharged from the expander, wherein
the evaporator comprises a plurality of heat transfer tubes arranged in rows in a flow direction of a high-temperature fluid to be heat-exchanged with the working fluid,
when the heat transfer tube located in a most upstream row in the flow direction of the high-temperature fluid is defined as a most upstream heat transfer tube, the following requirement (A), or (B) is satisfied:
(A) the rows comprise a first section and a second section, the first section including the most upstream heat transfer tube, and the second section including the heat transfer tubes other than the most upstream heat transfer tube so that the second section accepts the working fluid having passed through the first section and allows the working fluid to exchange heat with the high-temperature fluid in a counter-flow manner; and (B) the rows comprise a first section and a second section, the first section being composed of rows adjacent to each other and including the most upstream heat transfer tube in one of the rows and the heat transfer tube forming an inlet of the evaporator in a row other than the row of the most upstream heat transfer tube, and the second section being located downstream of the first section in the flow direction of the high-temperature fluid and accepting the working fluid having passed through the first section, the working fluid has a thermal decomposition temperature lower than a temperature of the high-temperature fluid flowing on an outer peripheral surface of the most upstream heat transfer tube and is in a liquid phase or in a gas-liquid two phase when flowing in the most upstream heat transfer tube the evaporator is a fin tube heat exchanger comprising a fin and further comprises a heat insulating structure that prevents heat transfer between the first section and the second section, the first section and the second section share the fin, and the heat insulating structure comprises a through hole formed in the fin at a boundary between the first section and the second section.

2. The Rankine cycle apparatus according to claim 1, wherein the requirement (B) is satisfied, and at least a portion of the first section is configured to allow the working fluid and the high-temperature fluid to exchange heat with each other in a counter-flow manner.

3. The Rankine cycle apparatus according to claim 2, wherein the second section is composed of rows adjacent to each other and is configured to allow the working fluid and the high-temperature fluid to exchange heat with each other in a parallel-flow manner in the heat transfer tubes located in at least two of the adjacent rows.

4. The Rankine cycle apparatus according to claim 2, wherein the second section is composed of rows adjacent to each other and is configured to allow the working fluid and the high-temperature fluid to exchange heat with each other in a counter-flow manner in the heat transfer tubes located in at least two of the adjacent rows.

5. The Rankine cycle apparatus according to claim 1, wherein the requirement (A) is satisfied.

6. The Rankine cycle apparatus according to claim 5, wherein the most upstream heat transfer tube forms an inlet of the evaporator so that the working fluid flows into the evaporator through the inlet and first passes through the most upstream heat transfer tube.

7. The Rankine cycle apparatus according to claim 1, wherein a member constituting the first section is spaced from a member constituting the second section.

8. The Rankine cycle apparatus according to claim 1, wherein the first section includes nothing but the heat transfer tube or the heat transfer tubes, and the second section has a structure of a fin tube heat exchanger.

9. The Rankine cycle apparatus according to claim 1, wherein the number of rows in the second section is larger than the number of rows in the first section.

10. The Rankine cycle apparatus according to claim 1, wherein an outer diameter of the heat transfer tube included in the first section is larger than an outer diameter of the heat transfer tube included in the second section.

11. The Rankine cycle apparatus according to claim 1, wherein the most upstream heat transfer tube is an internally smooth tube.

12. The Rankine cycle apparatus according to claim 1, wherein the evaporator is a fin tube heat exchanger comprising a fin, and the fin is a flat fin without a cut-and-raised portion.

13. The Rankine cycle apparatus according to claim 1, wherein the most upstream heat transfer tube is offset in the flow direction of the high-temperature fluid.

14. A combined heat and power system comprising:

the Rankin cycle apparatus according to claim 1; and a heat medium circuit in which a heat medium flows, the heat medium serving as a low-temperature heat source for cooling the working fluid in the condenser of the Rankine cycle apparatus.

15. The Rankine cycle apparatus according to claim 1, wherein the first section includes only the most upstream heat transfer tube, the most upstream heat transfer tube is an internally smooth tube, and each of the heat transfer tubes in the second section is an internally grooved tube.

16. An evaporator for use in a Rankine cycle, comprising a plurality of heat transfer tubes arranged in rows in a flow direction of a high-temperature fluid to be heat-exchanged with a working fluid in the Rankine cycle, wherein when the heat transfer tube located in a most upstream row in the flow direction of the high-temperature fluid is defined as a most upstream heat transfer tube, the following requirement (A), or (B) is satisfied:

(A) the rows comprise a first section and a second section, the first section including the most upstream heat transfer tube, and the second section including the heat transfer tubes other than the most upstream heat transfer tube so that the second section accepts the working fluid having passed through the first section and allows the working fluid to exchange heat with the high-temperature fluid in a counter-flow manner; and (B) the rows comprise a first section and a second section, the first section being composed of rows adjacent to each other and including the most upstream heat transfer tube in one of the rows and the heat transfer tube forming an inlet of the evaporator in a row other than the row of the most upstream heat transfer tube, and the second section being located downstream of the first section in the flow direction of the high-temperature fluid and accepting the working fluid having passed through the first section, the working fluid has a thermal decomposition temperature lower than a temperature of the high-temperature fluid flowing on an outer peripheral surface of the most upstream heat transfer tube and is in a liquid phase or in a gas-liquid two phase when flowing in the most upstream heat transfer tube the evaporator is a fin tube heat exchanger comprising a fin and further comprises a heat insulating structure that prevents heat transfer between the first section and the second section, the first section and the second section share the fin, and the heat insulating structure comprises a through hole formed in the fin at a boundary between the first section and the second section.

17. The evaporator for use in a Rankine cycle according to claim 16, wherein the requirement (A) is satisfied, and
the most upstream heat transfer tube forms an inlet of the evaporator so that the working fluid flows into the evaporator through the inlet and first passes through the most upstream heat transfer tube.

18. The evaporator for use in a Rankine cycle according to claim 16, wherein
the first section includes only the most upstream heat transfer tube,
the most upstream heat transfer tube is an internally smooth tube, and
each of the heat transfer tubes in the second section is an internally grooved tube.

\* \* \* \* \*